E. P. LINDAHL.
COATING APPARATUS.
APPLICATION FILED NOV. 1, 1918.

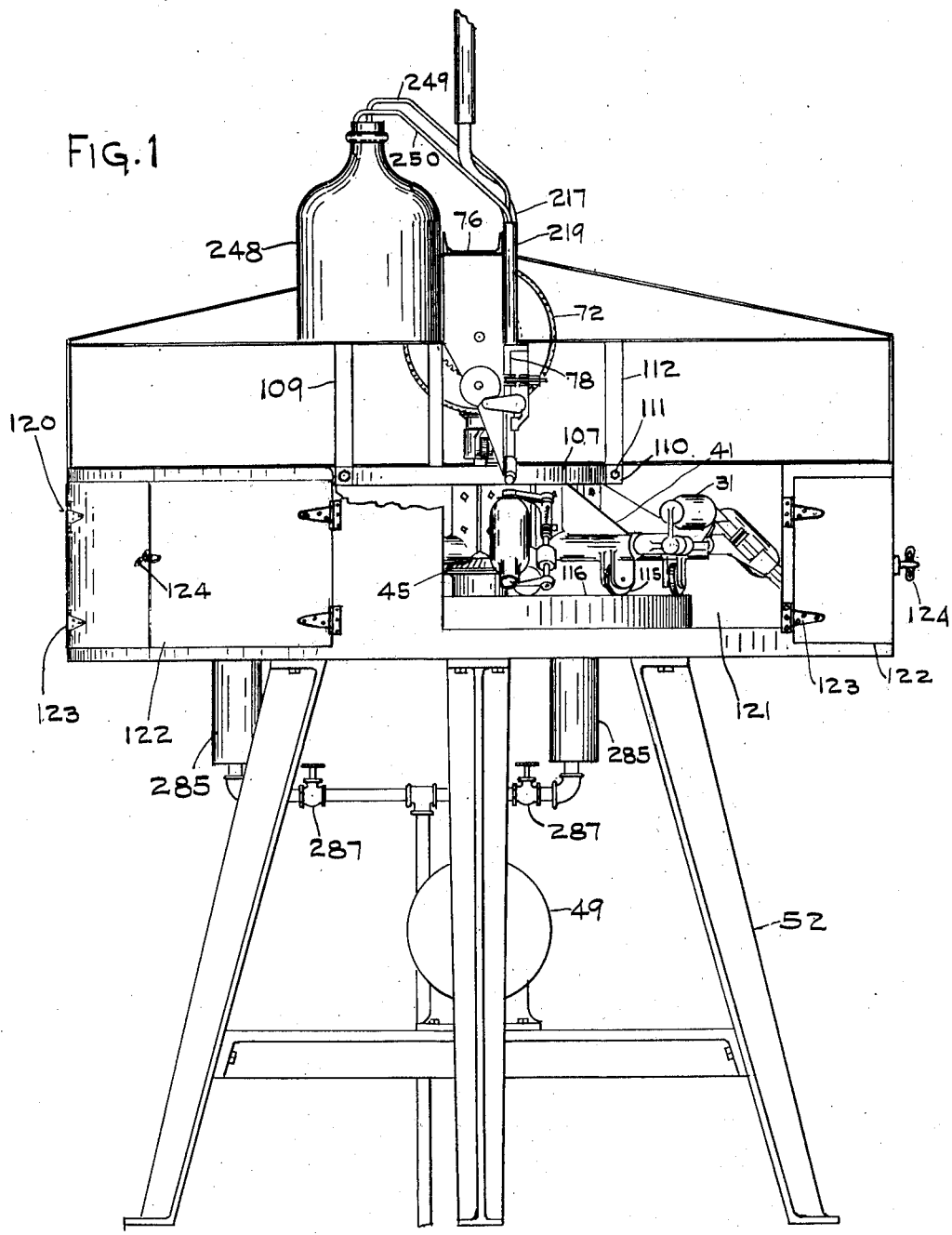

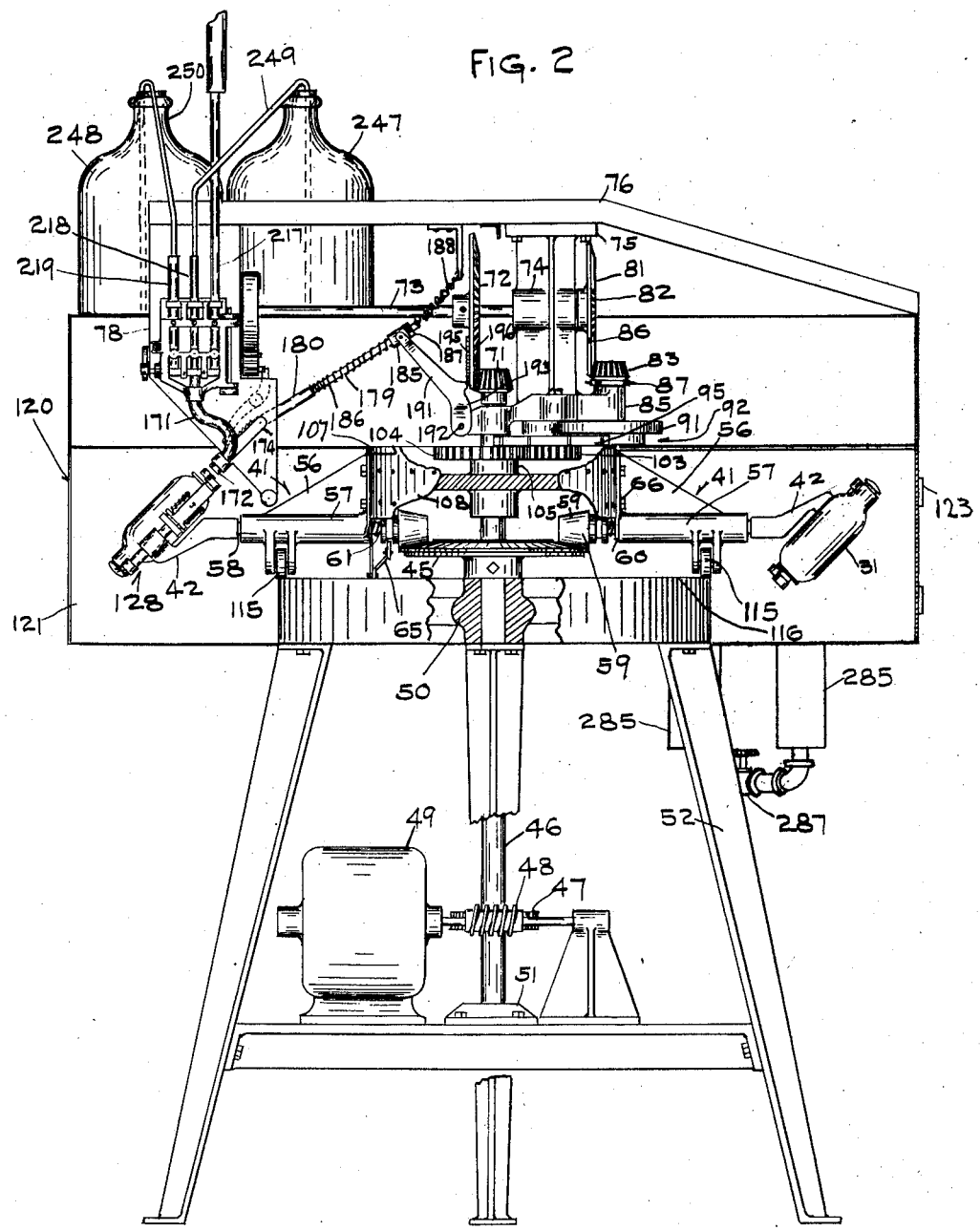

1,338,940.

Patented May 4, 1920.
8 SHEETS—SHEET 3.

INVENTOR
Erich P. Lindahl,
by his Attorney.

E. P. LINDAHL.
COATING APPARATUS.
APPLICATION FILED NOV. 1, 1918.
1,338,940.
Patented May 4, 1920.
8 SHEETS—SHEET 4.
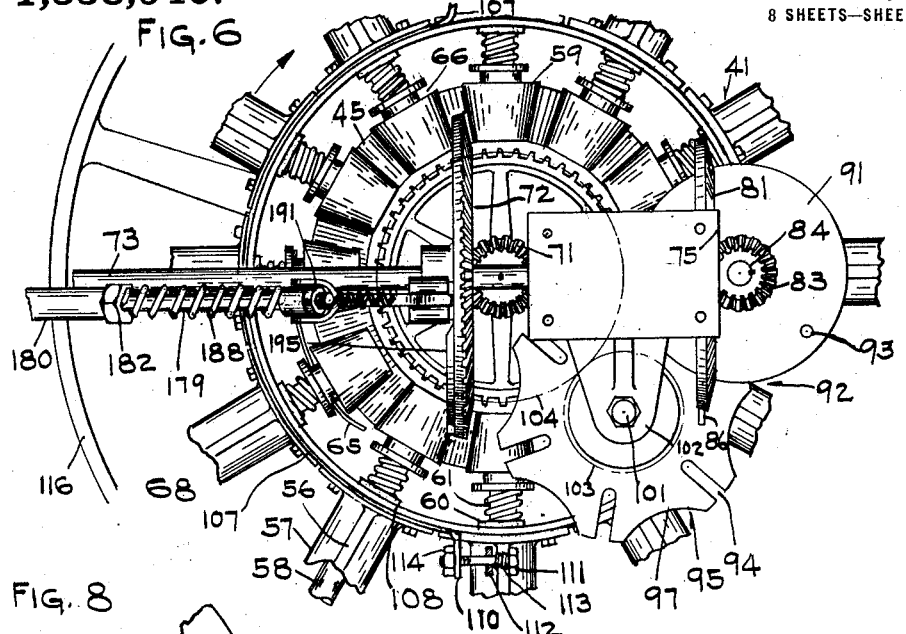
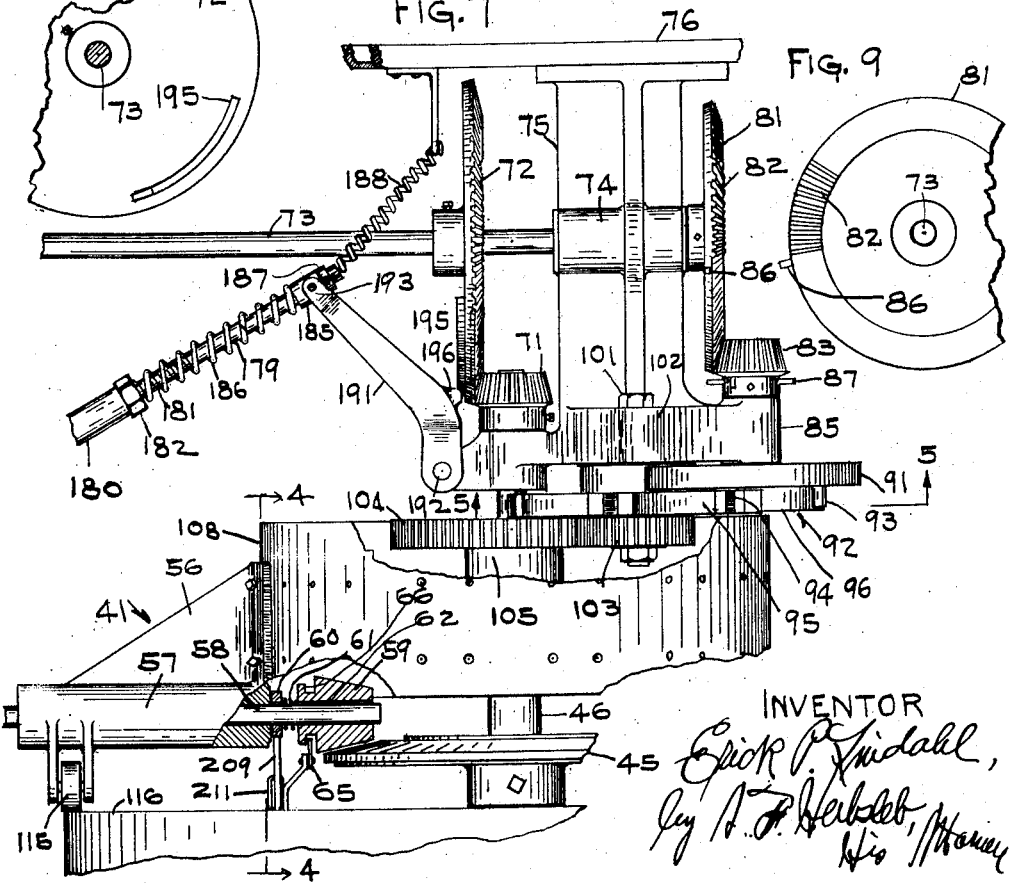
INVENTOR
Erick P. Lindahl,

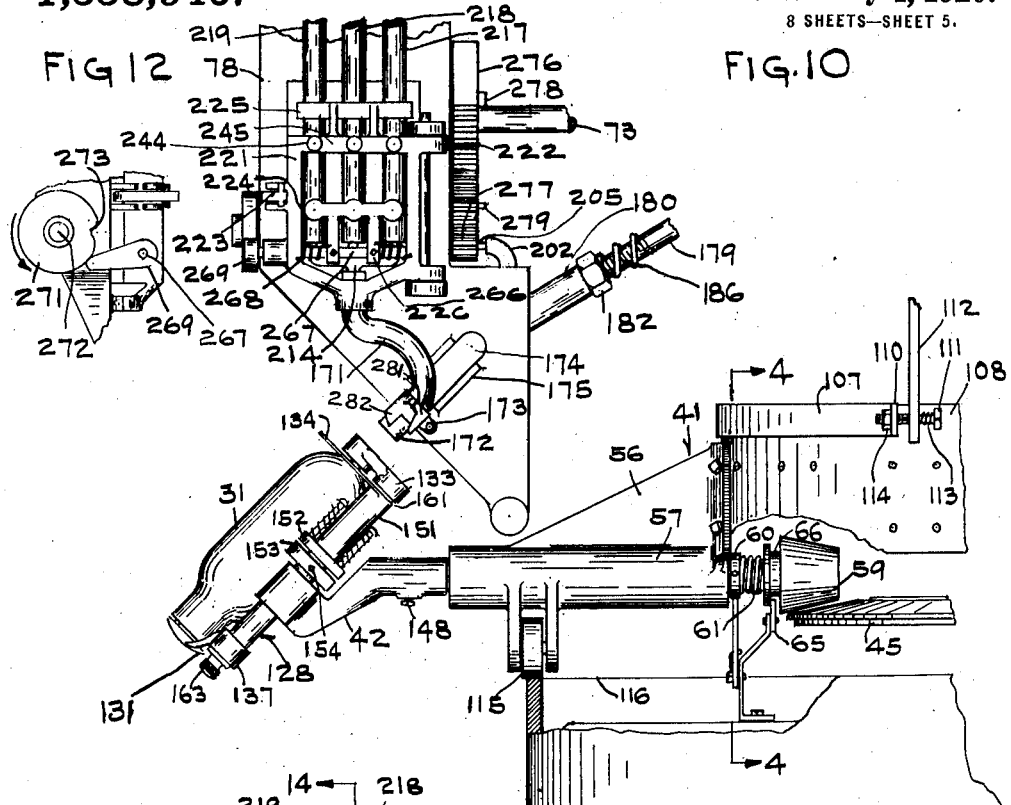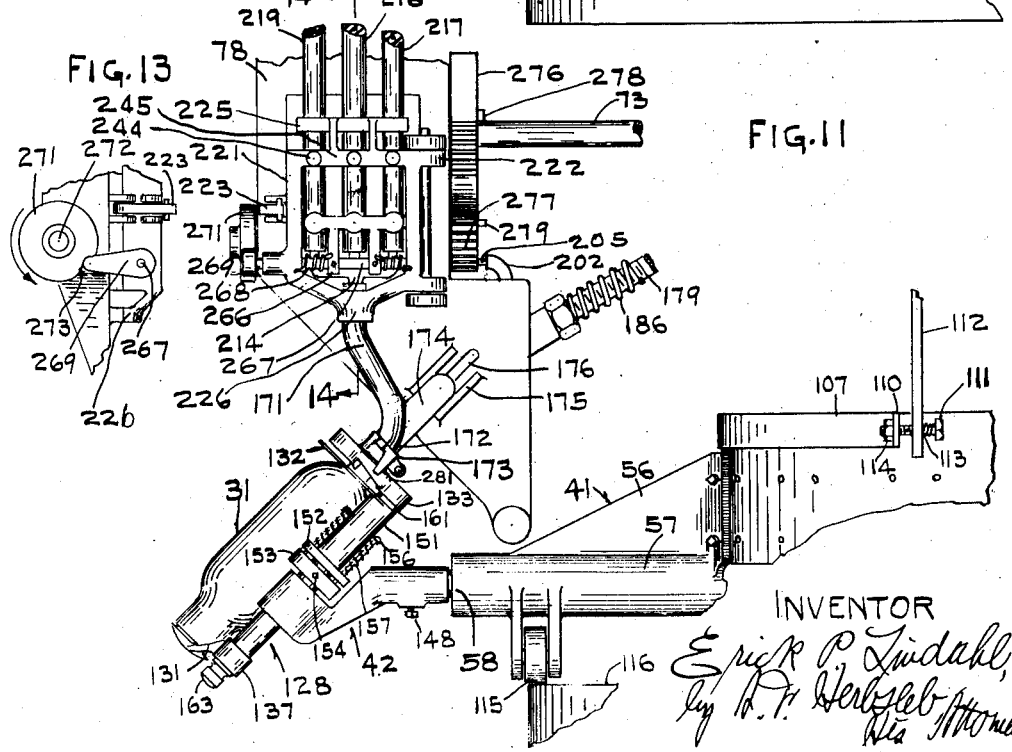

E. P. LINDAHL.
COATING APPARATUS.
APPLICATION FILED NOV. 1, 1918.
1,338,940.
Patented May 4, 1920.
8 SHEETS—SHEET 6.
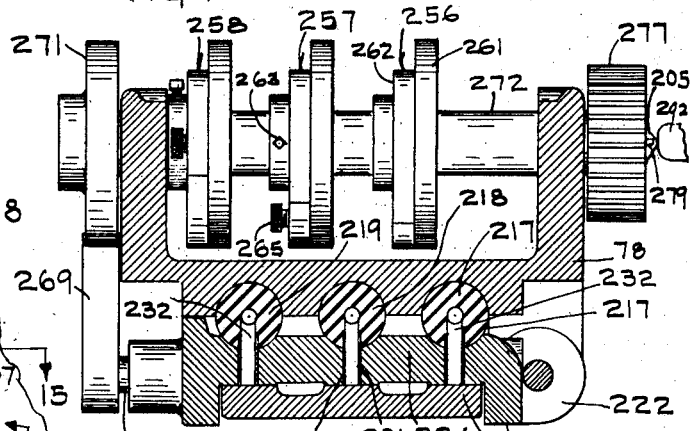
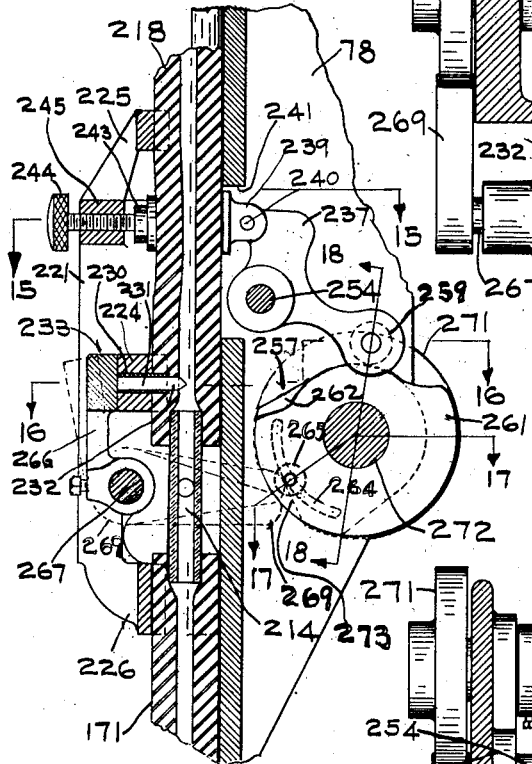
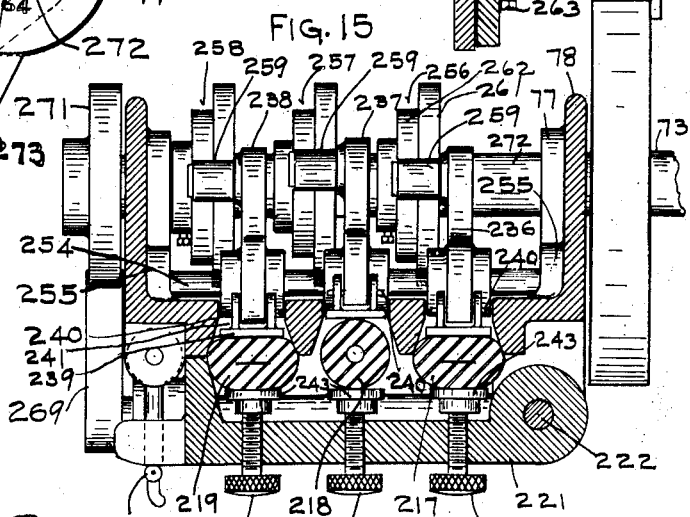
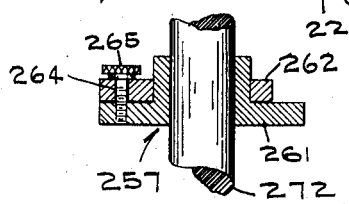
INVENTOR

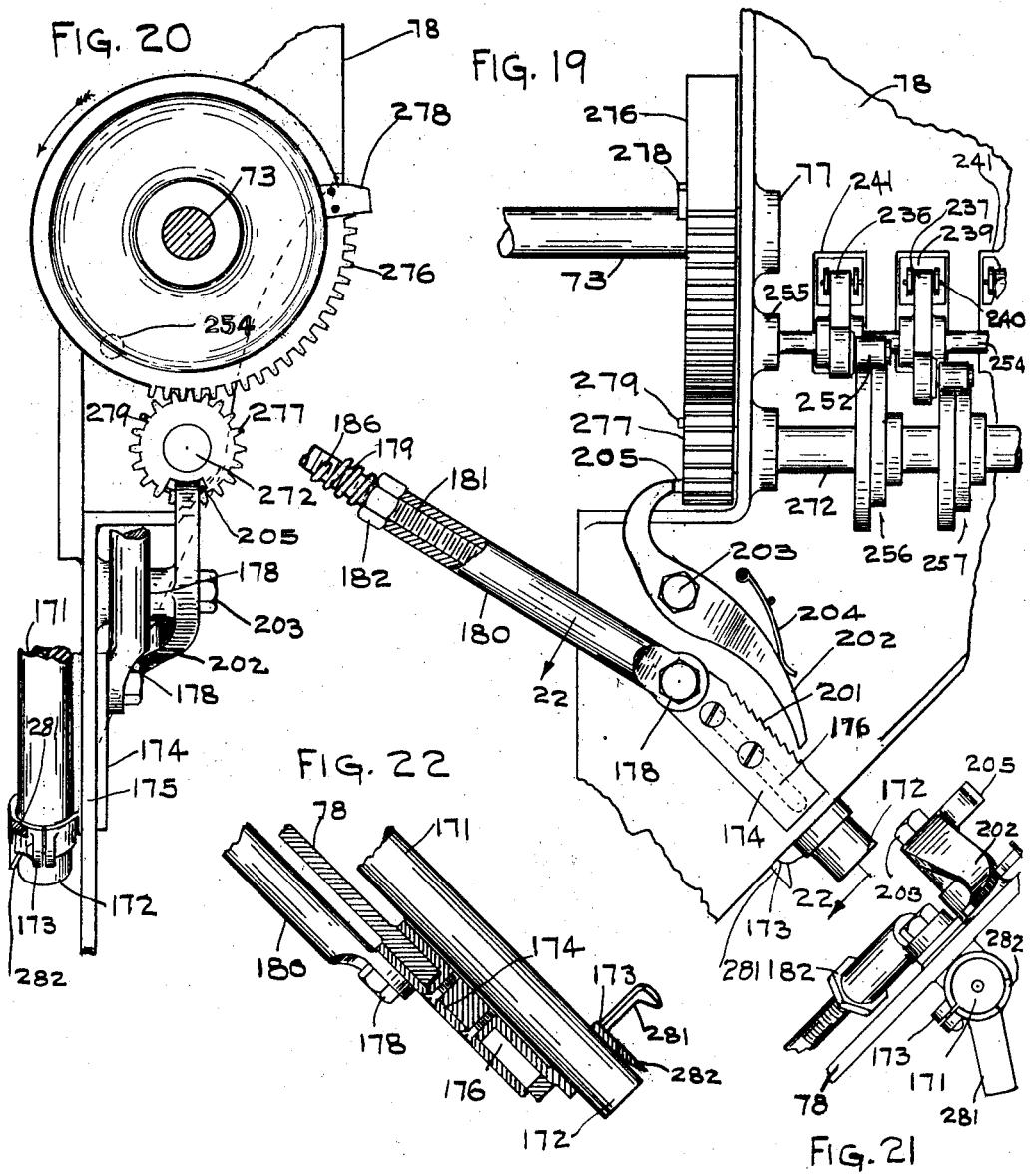

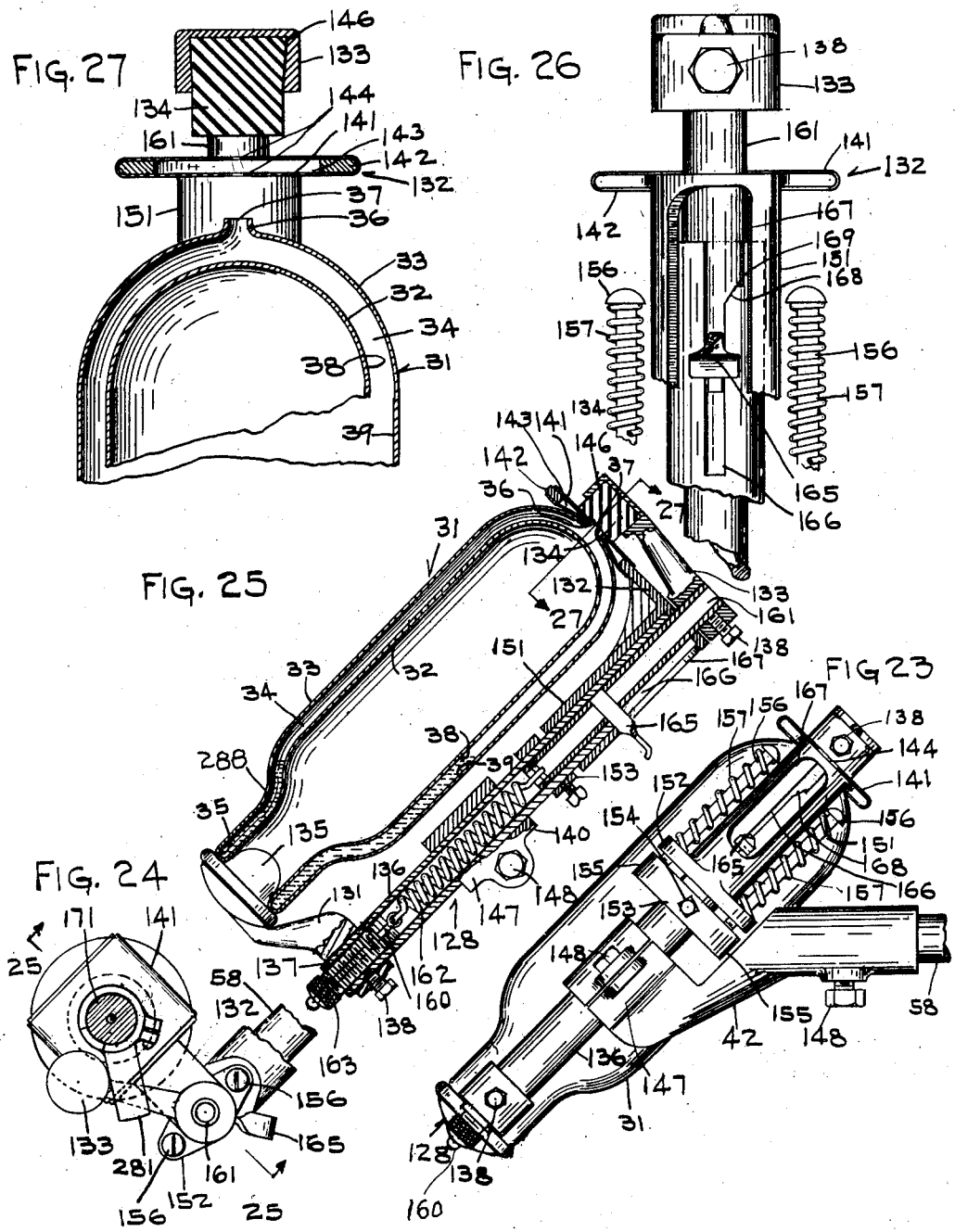

UNITED STATES PATENT OFFICE.

ERICK P. LINDAHL, OF CINCINNATI, OHIO, ASSIGNOR TO THE ICY-HOT BOTTLE COMPANY, OF CINCINNATI, OHIO, A CORPORATION OF WEST VIRGINIA.

COATING APPARATUS.

1,338,940.  Specification of Letters Patent.  Patented May 4, 1920.

Application filed November 1, 1918. Serial No. 260,699.

*To all whom it may concern:*

Be it known that I, ERICK P. LINDAHL, a citizen of the United States, residing at Pleasant Ridge, in the city of Cincinnati, county of Hamilton, and State of Ohio, have invented certain new and useful Improvements in Coating Apparatus, of which the following is a specification.

It is the object of my invention to provide a new and improved coating apparatus employable, for example, in providing the inner surface of the wall about the space intended to form the vacuum insulated space of a vacuum insulated vessel with a suitable coating, instanced as a mirror or silvering coating, for aiding in heat insulation.

I shall show and describe my invention in connection with such use as an exemplification. The vessels operated on may be any suitable vessels or blanks, for instance, bottles, carafes, pitchers, jugs, or other articles or blanks, and are exemplified as bottles of the vacuum insulated type.

It is the object of my present invention to provide new and improved means for locating the vessel in charging position; to provide new and improved means for charging the vessel; to provide new and improved means for controlling the charging of the vessel with coating material; to provide new and improved means for closing the charged vessel; further to provide new and improved means for supporting the vessel; and, further, to provide new and improved means for causing travel of the vessel.

The invention will be further readily understood from the following description and claims, and from the drawings, in which latter:

Figure 1 is a front elevation of my improved device, partly broken away.

Fig. 2 is a side elevation of the same, with the casing and parts partly broken away.

Fig. 6 is a plan view of the driving mechanism.

Fig. 7 is a side elevation of the same, partly broken away.

Fig. 8 is a face view of the cam gear.

Fig. 9 is a face view of the mutilated gear of the driving mechanism.

Fig. 10 is a side elevation of the charging mechanism, shown in idle relation.

Fig. 11 is a similar view, showing the same in charging relation.

Fig. 12 is an end view detail, showing the operating means for the relief means, in closed relation.

Fig. 13 is a similar view of the same in relieving relation.

Fig. 14 is a vertical section of the charging mechanism, partly broken away, taken on the line 14—14 of Fig. 11, and showing the same in charging position.

Fig. 15 is a cross-section of the same, in the plane of the line 15—15 of Fig. 14.

Fig. 16 is a horizontal cross-section of the same in the plane of the line 16—16 of Fig. 14.

Fig. 17 is an axial cross-sectional detail of the cam adjustment, taken on the line 17—17 of Fig. 14.

Fig. 18 is an axial cross-section of the same taken on the line 18—18 of Fig. 14.

Fig. 19 is a rear elevation detail of the charging mechanism, partly broken away.

Fig. 20 is an edge elevation of the same.

Fig. 21 is an end view of the same.

Fig. 22 is a detail of the same, in section on the line 22—22 of Fig. 19.

Fig. 23 is a side elevation of the chuck.

Fig. 24 is an end elevation of the same, with the stopper in off-set relation, and the charging tube in charging position.

Fig. 25 is an axial section of the same taken on the line 25—25 of Fig. 24, with the stopper in closing relation.

Fig. 26 is a rear view detail showing the bottle holding parts in assumed positions; and, Fig. 27 is an axial sectional detail of same, showing the same relation of parts, and taken in the plane of the line 27—27 of Fig. 25.

Figure 4:
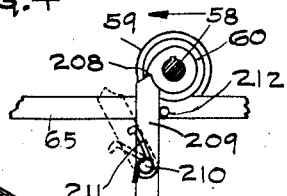
Fig. 4 is a detail of the means for stopping rotation of the vessel-supports, shown in section on the line 4—4 of Fig. 7.

The present invention is an improvement on the coating apparatus shown, described and claimed in my copending application Serial No. 172,653, filed June 4, 1917.

The vessel, the wall of which is instanced to be coated, is a glass bottle 31 (see Figs. 25 and 27), comprising an inner wall 32 and an outer wall 33, forming a space 34 between the walls, designed to be provided with a vacuum of suitable extent for heat-insulating the bottle. The walls are shown as connected at 35 at the mouth of the bottle for hermetically sealing the space at the mouth. The wall of the space is at a suitable point provided with a sealing teat, exemplified at 36, which during operations of my invention is unsealed, being provided with an aperture 37.

In the usual practice of making heat-insulated vessels of this character, the walls of the vessel, which are usually of glass, are preferably first formed up and connected for forming the heat-insulating space. The inner surfaces 38, 39, of the walls of said space are then provided with a coating, for instance of silvering compound, or a so-called mirror or silver surface, for the purpose of preventing or retarding transmission of certain of the heat rays through said space, after which the air in the space is exhausted to greater or less extent for providing said space with a vacuum of suitable degree, the sealing teat being then sealed for sealing the vacuum within the space.

The present exemplification of my invention is directed to improved means for coating the wall of the vacuum space.

In carrying out my invention, I prefer to provide the space, the inner surfaces of the walls of which are to be coated, with a partial vacuum, inject the coating material into the partially vacuated space, subject the vessel to a movement which causes the coating material to be applied uniformly to the wall, draw off the residue of the coating material, and rinse the coated surface.

My invention contemplates a carrier 41 for supports 42 of the vessels, the inner surfaces of the walls of which are to be coated, the carrier being exemplified as a rotatable carrier and the supports as rotatable supports, the vessels being so supported as to rotate in such manner as to cause movement of the coating material about and lengthwise of the wall to be coated.

I have exemplified the means of rotation so arranged that rotation of the respective supports may be arrested while the vessels are removed from and applied to the respective supports and while being charged, during which operations the rotation of the carrier is preferably also arrested, rotations of the balance of the supports preferably taking place during the arrest of the support.

For accomplishing these objects I employ a prime moving gear 45, (see Figs. 1, 2, 6 and 7), exemplified as a bevel-friction gear, fixed to a shaft 46 rotated in suitable manner, as by means of a worm-wheel 47 fixed thereon, meshed by a worm 48 on the armature-shaft of a suitable electric motor 49.

The shaft 46 rotates in bearings 50, 51, on the main frame 52 of the machine.

The carrier has brackets 56 radiating therefrom, having bearings 57 thereon, in which shafts 58 are journaled. The respective shafts 58 have the supports 42 fixed thereon.

The shafts 58 have pinions 59 thereon, exemplified as friction-pinions, which coact with the prime moving gear 45 for rotating the pinions. The shafts 58 are held in endwise relations in their bearings by means of the supports 42 and collars 60 fixed to said shafts. The pinions are normally resiliently urged axially toward the gear 45 by springs 61, shown as surrounding the shafts 58, one end thereof abutting the collars and the other end abutting the pinion, the pinion having slight axial movement on the shaft while rotatively fixed to the shaft, by a spline-connection 62. (See Fig. 7).

In order to release the pinion from operative coaction with the gear at the operator's position and charging position of the support, the pinion is moved axially, accomplished by means of a cam 65, fixed to the frame, against which the outer wall of an annular groove 66 in the pinion is adapted to ride adjacent to said positions, for moving the pinion axially away from the gear 45. (See Figs. 4, 6, and 7).

Intermittent movements are imparted to the carrier so as to cause the various brackets and bottle-supports to come to at-rest positions at the operator's stations 67, 68, at one of which the charging is represented as taking place. These means are exemplified as follows, (see Figs. 2, 5, 7, 8, 9 and 19):

A bevel-pinion 71 is fast with drive-shaft, and meshes with a bevel-gear 72 fast on a cross-shaft 73, journaled in a bearing 74 of a hanger 75 depending from a cross-girt 76 of the main frame of the machine, and in a bearing 77 of a charging frame 78, rigidly connected with the main frame.

A mutilated bevel-gear 81 is fixed to the cross-shaft 73 and has teeth 82 throughout only a portion of its circumference, which represents it as a small portion and just sufficient to approximately move the carrier from one position to the next. The mutilated gear meshes with a bevel-pinion 83 fixed to a shaft 84, journaled in a bearing 85 of the hanger 75. In order to induce proper meshing between the teeth 82 and the teeth of the bevel-pinion 83, I provide the bevel-gear 81 with a pin 86, which is arranged to engage pins 87 on the bevel-pinion 83 in advance of the meshing relation between the teeth of the gears for relatively positioning the gears in such relation as to insure proper meshing of the teeth.

A pin-disk 91 of a Geneva movement device 92, is fixed to the shaft 84. The pins 93 thereof coact with the slots 94 of the star-wheel 95 of said device. (See Figs. 2, 3, 5, 6 and 7). In the present exemplification the pin-disk is provided with two actuating pins and the star-wheel is provided with six coacting slots, there being a reduction gearing between the star-wheel and the carrier of two to one, thereby providing for twelve rest-positions of the carrier at the operator's station, there being twelve brackets and blank-supports on the carrier. Hub-sectors 96 of the pin-disk coact with arc recesses 97 in the star-wheel while the carrier is in its at-rest positions. The star-wheel rotates about a stud-shaft 101, fixed in a bearing 102 of the hanger, and has a pinion 103 fast therewith, the pinion meshing with a gear 104 fast with the hub 105 of the carrier, which hub acts as a bearing in which the drive-shaft rotates and about which drive-shaft the carrier receives rotation.

In this manner positive rotation and positive cessations of rotation are provided for the carrier. The carrier has quick intermittent movements imparted thereto, as by the mutilated gear 81, which imparts a quick semi-rotation to the Geneva movement, the latter starting and stopping the carrier with an easy motion to prevent shock. The shaft 73, on which the mutilated gear is located imparts movements to the mechanism for charging the vessel, in manner hereinafter described, during the consequent comparatively long intervals between actuations of the Geneva movement. Speed of operation is thus effected, and the durations of movements of the carrier correctly timed with relation to the durations of the charging, providing comparatively great durations of charging compared with the durations of carriage movements. In order, however, to provide means for causing ready stoppage of the carrier and prevent an overthrow of movement thereof at the rest-position, I provide a friction-band 107, received about the annular central portion 108 of the carrier and exemplified as encompassing about one-half said portion. (See Figs. 1 and 6). The respective ends of the friction-band are held with relation to the carrier by having one end thereof fixed to a lug 109, and the other end thereof provided with a flange 110, through which a bolt 111, held in a lug 112 on the frame, passes. A spring 113 is received about the bolt, between the lug 112 and the head of the bolt, a nut 114 on the bolt acting on the flange 110. The spring aids in urging frictional resistance to rotation of the carrier, and is adjusted by the nut.

Rotation of the gear 45 causes rotation of the pinions 59 for rotating the shafts 58 and the supports 42. The pinions move planetwise about the gear. The springs 61 urge the pinions toward the gear. The carrier rotates loosely about the shaft 46, it having the hub 105 which acts as a bearing about the shaft. The outer ends of the brackets 56 are preferably provided with rollers 115, which ride on a track 116, for aiding in the support of the carrier.

While the carrier is being rotated, in the present exemplification, part of the motion of the gear 45 is imparted to the pinions 59 for rotating the supports 42, and part of said motion is expended in the traverse of the pinions about the gear. When rotation of the carrier ceases, the entire motion of the gear 45 is imparted to the pinions 59 in operative connection therewith, thereby accelerating the speed of rotation of the supports 42 which remain in operative relation with the gear.

The supports preferably rotate and move annularly in a casing 120, exemplified as supported on the main frame, and as inclosing the vessels or blanks while being coated, the casing having an opening 121 through which the vessels or blanks are inserted and removed from the rotatable supports. It may also be provided with doors 122 hinged to the wall of the casing by hinges 123, and held in closed positions by means of latches 124.

The respective supports are exemplified as a chuck 128. (See Figs. 10, 11 and 23–27 inclusive.) The chucks comprise means for positioning the bottle in the chuck, and means for closing the cavity which is being coated, preferably arranged for independent operation at different times for first permitting charging of the cavity with the coating material, and then closing the cavity. Thus the chuck is provided with arms 131, 132, 133. The bottle is arranged to be positioned between the arms 131 and 132, and the arm 133 is provided for closure 134 for closing the aperture 37 in the bottle. The arm 131 comprises a positioning part 135 for the mouth of the bottle, the positioning part being preferably of a material such as wood, rubber or the like, to properly position the bottle and prevent injury thereto. The arm 131 is held in adjusted positions on a shank 136 of the chuck by having a bearing 137 about said stem and a bolt 138 to clamp said bearing in adjusted positions lengthwise of said shank to support vessels of different sizes.

The arm 132 is provided with a positioning part, arranged to coact with the positioning part 135. The positioning part preferably comprises a soft and yieldable perforated seat exemplified as a band 141 of rubber stretched about a plate 142 of the arm. The plate has an opening 143 therethrough, in which the rounded bottom of the bottle is received, and the resilient band has openings 144 therethrough through which the teat of the bottle projects.

The arm 133 is provided with a pocket 146, in which the closure 134, shown as a stopper of soft and yieldable material, for instance of rubber, is received, the stopper coacting with the teat of the bottle for closing the aperture 37, and maintaining the coating composition in the space 34.

Relative movement may be imparted to the arms for permitting insertion and removal of the bottles and for closing the cavity thereof. Thus the arm 131 is exemplified as adjustably fixed to the relatively stationary hollow shank 136 of the chuck, which is arranged to be clamped in adjustable positions in a clamp-bearing 147, which is part of the support and is fixed to the shaft 58 as by a clamp bolt 148. This adjustment is provided for positioning the bottle axially with relation to the charging tube hereinafter described.

The arm 132 is fixed to a relatively movable part 151, exemplified as a tube surrounding the shank 136, the arm 132 extending from said tube. The tube is provided with lugs 152. A collar 153 is fixed to the shank by a set-bolt 154 and is provided with lugs 155. Stems 156 are secured to the lugs 155 and extend through holes in the lugs 152. Springs 157 are received about the stems between the heads thereon and the lugs on the tube for normally urging the arm 132 toward the arm 131, thereby resiliently holding the bottle between said arms.

The arm 133 is fixed to a stem 161, received in the hollow shank 136. A spring 162 in the hollow shank has its respective ends secured to the stem 161 and to a stem 160 swiveled in an adjusting screw 163 threaded in the outer end of the shank, for normally urging the arm 133 toward the arm 131, and normally urging the stopper 134 thereon against the teat. The screw provides adjusting means for the spring.

The stem is provided with a finger 165, received through a slot 166 in the shank and an opening 167 in the tube 151. One of the walls of the slot is provided with slanting face 168, and a seat 169. The finger is arranged to be moved lengthwise of said slot outwardly for moving the stopper away from the bottle position and is also arranged to be moved laterally for causing the finger to rest on the seat 169. The lateral movement of the finger also moves the arm 133 laterally for moving the stopper to the side of the position of the aperture 37. When the finger is thus moved laterally it is arranged to rest on said seat for positioning the stopper in lateral position to provide room for the charging mouth to be placed in connection with the aperture for charging the cavity, means being provided for return of the stopper laterally into coactive position with relation to the aperture when the charging has taken place.

The insertion of the bottle is preferably had by inserting the teat of the bottle into the holes 144 in the band 141 and urging the bottom of the bottle toward the arm 132, and pushing the arm outwardly so as to seat the mouth end of the bottle about the positioning part 135, the springs 157 causing seating of the mouth-end about the positioning part and holding the bottle in place. It is assumed that the arm 133 and the stopper thereon have been moved into outward and lateral position prior to insertion of the bottle.

When the bottle has been secured to the support, the space therein is charged with the coating material. This is accomplished by means of a tube 171, exemplified as a flexible hose, the mouth-end 172 of which is secured by a clip 173 to a slide 174, and forms a charging mouth. The slide has movement in a guide 175 of the charging frame. (See Figs. 2, 10, 11 and 19-22 inclusive). The slide passes through a slot 176 in the charging frame. The end of the flexible hose, which is preferably of rubber, is soft and seats readily on the flexible band and bottom of the bottle, and about the aperture 37 therein, without danger of breaking or injuring the bottle, the passage in the hose registering with said aperture.

For moving the charging mouth toward and from the bottle, I provide a rod, articulated to the slide at 178, and shown as an extensible rod by forming the same of the sections 179, 180, which telescope one within the other and are adjustable with relation to each other by the threaded connection 181 between them, a clamp-nut 182 clamping the parts in adjusted positions. (See Figs. 2, 6, 7, and 19-22). A collar 185 is located about the section 179 and is adapted to slide lengthwise thereon. A spring 186 is received about the rod between said collar and the nut 182 and cushions the movement of the rod toward the bottle. A collar 187 is fixed to the rod, and limits relative outward movement between the collar 185 and the rod. A spring 188, the respective ends of which are secured to the frame and to said rod, normally retracts said rod and the charging mouth.

A lever 191 is articulated to the hanger 75 at 192, and has a fork 193 received about and articulated with the collar 185. (See Figs. 2, 6, 7 and 8). Movement of the lever toward the bottle causes connection between the charging mouth of the tube and the charging aperture in the bottle, and forms a joint between the tube and the bottle for the charge of solution to be received in the space in the bottle. The movement of the lever is instanced as accomplished by a cam 195 on the gear 72 acting on a lug 196 on the lever.

The cam is instanced as arranged for moving the tube into connecting relation with the bottle and to maintain this connecting relation for the duration of time that the flow of solution into the space takes place, the rear end of the cam passing beyond the lug for retracting the lever and charging mouth when such flow has been accomplished.

The cam is arranged to act on the lever during rest-positions of the bottle-supports and is shown as in alternate position with the teeth of the mutilated gear 81, so that the teeth of the mutilated gear act to move the carrier between actions of the cam on the lever.

If desired the tube may be held in connected relation with the bottle by means of a ratchet-rack 201 on the slide, with the teeth of which a pawl 202 is arranged to coact. (See Figs. 19, 20 and 21.) The pawl is pivoted to the charging frame by pivot 203, its tooth being normally urged toward the teeth of the rack by a spring 204. When, now, the slide is moved toward the bottle, the teeth of the rack pass along the tooth of the pawl until the limit of movement of the slide is reached, the slide being held in this limit by the engagement of the pawl with the rack, until the pawl is disengaged, whereupon the slide is retracted. The disengagement of the pawl is caused at intervals corresponding to the end of the charging period, and is accomplished by means of a cam 205 rotatably supported in manner hereinafter to be described. The retraction of the rod is attained by means of the spring 188. The movement of the charging mouth into charging and idle relations is automatically effected.

The bottle support is, while in charging position, arranged to be held in charging relation with the charging tube so as to present its charging aperture to the charging tube. Rotation of the bottle support ceases during the charging of the bottle.

The bottle support is placed out of coactive relation with the gear 45 by endwise shifting of the pinion 59, accomplished by the cam 65, located to coact with the wall of the annular slot 66 in the hub of the pinion when the pinion arrives at the operator's position, whereby the pinion is moved endwise out of engagement with the gear. (See Figs. 2, 4, 5 and 6.)

For positioning the bottle-support in coactive relation with the charging mouth, the collar 60 has a stop-face 208 thereon. (See Figs. 2, 4 and 7.) When the support arrives in at-rest position at the operator's station, the stop-face is arranged to engage a stop 209, pivoted at 210 to the frame and normally urged into stopping position by means of a spring 211 for moving the stop 209 against a stop-pin 212. When the stop-face engages the stop the charging aperture in the bottle is in coactive relation with the charging mouth. When the carrier again moves, the stop 209 is swung on its pivot so as to permit the collar to move past the range of the stop.

The tube 171 is a flexible tube. The end thereof opposite the charging mouth is received about the discharge tube of a manifold 214. (See Figs. 10, 11, 14, 15 and 16.) Flexible tubes 217, 218, 219, are connected with three receiving branches of the manifold, and have passages therethrough.

A gate 221 is pivoted to the charging frame on a hinge 222, and is arranged to be held to the charging frame by a latch 223. (See Figs. 10, 11, 14, 15 and 16.) The face of the bracket along which the tubes pass is provided with grooves, in which the respective tubes are received, the gate being provided with corresponding grooves coacting with the opposite faces of the tubes. (See Figs. 14 and 16.) These latter grooves are located for instance in a cross-bar 224 and an upward extension 225. The gate is provided with a recessed clamp 226 received over the tube 171 for holding the receiving end of said tube to the charging frame, the charging frame and clamp being provided with grooves to receive said end.

The cross-bar 224 is provided with apertures 230 in which ferrules 231 are received. The ferrules extend into holes 232, forming ports in the tubes 217, 218, 219, and communicate with the passages therein. The ferrules also aid in positioning the tubes lengthwise. The ports are arranged to be closed by valves 233.

The passages in the tubes 217, 218, 219, are arranged to be closed, as by means of pressers 236, 237, 238, respectively coacting with the tubes. (See Figs. 14 and 15.) The pressers thereby form valves. The pressers comprise shoes 239, pivoted to the bodies of the pressers by means of pins 240. The shoes are received through apertures 241 in the charging frame. The normal sizes of the passages in the tubes 217, 218, 219, may also be regulated, as by adjustable shoes 243, respectively positioned by thumbscrews 244, having threaded adjustment in a bar 245 of the gate 221. The shoes are pivotally held to the ends of the thumb-screws. The tubes are preferably rubber hose of suitable compressible nature.

The tube 217 leads to a suitable pump, or other device, for creating a rarefaction of air or vacuum for temporarily creating a partial vacuum or suction in the space 34, when the charging mouth has connection with the aperture 37 in the bottle. The tubes 218, 219, respectively communicate with suitable receptacles 247, 248. (See Figs. 1, 2 and 3.) Siphon tubes 249, 250, lead from the respective receptacles 247, 248, and have the tubes 218, 219, respectively received over their outer ends.

In the present exemplification of my invention the receptacle 247 contains a suitable silvering solution, preferably in fluid form. The receptacle 248 contains a suitable reagent, also preferably in fluid form, which acts on the silvering solution to precipitate the silver therein upon the inner surface of the wall of the space 34. The coating material and reagent displace air in said space, the partial vacuum in the space when employed acting as a suction medium for drawing the coating material and reagent into said space, the communicating passages with the suction or vacuum creating device having preferably been closed.

I prefer that the walls of all the passages and valves shall be of rubber or glass, as I have found that these materials are least detrimentally affected by the silvering solution and reagent, and the parts are so arranged that the tubes and valve-parts are readily renewable.

The pressers are independently pivoted on a rod 254, located in bearings 255 of the charging frame. (See Figs. 14 to 19 inclusive). Cams 256, 257, 258, operate the respective pressers. Each of the pressers is provided with a roller 259, which coacts with one of the cams.

Each of the cams is preferably a two-part cam comprising the members 261, 262, each of which has a part of the actuating face of the cam thereon in order to lengthen or shorten the time of the pressing action of the presser. (See Figs. 14 to 19 inclusive.) The cam-members are received about a shaft 272, the cam-member 261 being preferably adjustably secured to the shaft by a set-bolt 263. Cam-member 262 is provided with a slot 264, through which a clamp-screw 265 is received into a threaded aperture in the cam-member 261. When the cam-member 262 has been set with relation to the cam-member 261 for providing the proper length of time of pressing action of the presser, the clamp-screw is tightened for maintaining the parts in adjusted relation.

In order to cause any portion of the silvering solution or reagent which may be in the tubes below the positions of the pressers, to be received within the space 34, means are provided for opening the passages in said tubes at a point below said presser positions, exemplified by the ports 232, the ferrules 231 forming portions of said ports. The valve 233 coacts with said ports.

The valves 233 are mounted on arms 266 secured to a rock-shaft 267, journaled in bearings in the gate 221. Springs 268 act to normally close the valves by pressing the arms toward the tubes. An actuating arm 269 is fixed to the rock-shaft, (see Figs. 10, 11, 12, 13, 14, 15 and 16). An actuating cam 271 is fixed to the shaft 272, to which the cams 256, 257, 258, are secured, and is provided with a cam-recess 273. The periphery of the cam coacts with the actuating arm throughout the greater portion of the time of rotation of the cam for normally maintaining the valves in closed relation.

When the discharge of the silvering solution and reagent into the bottle is about completed, the actuating arm is received in the recess of the cam, whereby the springs 268 move the valves to open relation for opening the ports 232, and providing relief in the tubes below the ports and relieving the inner portion of the tubes from vacuum and permitting the ready discharge of the silvering solution and the reagent remaining in the tubes into the space in the bottle.

The recess in the cam acts at the proper point in the revolution of the shaft 272 to open said ports after a partial vacuum has been created in the space 34, and the charges of coating ingredients have passed the pressers 237, 238, and the pressers have been moved to close the passages in the tubes 217, 218, 219. The opening of the valves 233 causes any of the coating material in the tubes below said valves to pass into the space 34 and release any vacuum there may still be remaining in said space.

In explaining the operation of this part of the mechanism, it will be assumed that the bottle has been located in the support at the operator's station, at which station the bottle is secured to the support in manner hereinbefore stated, between the arms 131, 132, with the arm 133 located at one side of the axis of the bottle. The bottle next moves to the charging position. When the bottle arrives at the charging position it is placed in position in manner hereinbefore stated, so that its teat is in position to be acted upon by the charging mouth, the charging mouth being caused to automatically assume a connective relation with this teat.

The rotation of the shaft 272, in manner to be presently described, causes the dropping of the roller 259 off the high portion of the cam 256 with a quick release movement, caused by the comparatively abrupt depression in the cam, the resilience of the tube normally urging recession of the presser. Opening of the passage in the tube 217 is thereby caused, resulting in suction through the tube upon the air in the space 34 for drawing air from the said space. When the air has been thus rarefied or a partial vacuum formed, the presser 236 again closes said passage.

The continued rotation of the shaft 272 causes the releasing portions of the cams 257, 258, to reach the rollers of the pressers 237, 238, the presser 237 being preferably released and again pressed toward the tube for opening and closing the passage in the tube 218 before the release and subsequent closing movement of the presser 238. When the pressure of the presser 237 is relieved for opening the passage in the flexible tube 218, a charge of the silvering solution will pass the presser-position, the partial vacuum in the space 34 aiding the movement of the silvering solution into the space. The presser 237 is preferably returned to pressing position. The action of the presser 237 is followed by the relief of the presser 238 upon the flexible tube 219 for opening the passage therein to introduce a charge of the reagent into said space 34 for reaction on the silvering solution.

As soon as the proper amount of silvering solution and reagent have respectively passed the positions of the pressers, the respective pressers will again be moved into pressing relation by the cams coacting therewith. The flow of air and the flow of silvering solution and reagent may each be regulated by the adjustment of the cams and of the thumb-screws 244, so that the quantities and proportions of the ingredients of the coating compound may be regulated with exactness, thereby obtaining best results and saving in materials.

Actuation of the shaft 272 is instanced as caused by the following means, (see Figs. 10, 11, 15, 16, 19 and 20). The shaft 73 has a gear 276 fast thereon which is arranged to intermittently rotate a pinion 277 fast on the shaft 272. The shaft 73 has continuous rotation imparted thereto by the driving pinion 71 and gear 72 as hereinbefore explained. The intermittent rotation of the pinion 277 is exemplified as accomplished by forming the gear 276 as a mutilated gear, the teeth of which mesh periodically with the pinion 277. The gear 276 is provided with a lug 278 which coacts with a pin 279 on the pinion 277 for initiating proper meshing relation between said gear and pinion.

When the vessel or blank is inserted in the clutch, the arm 133 on the clutch which supports the stopper 134, is moved along the slot 166 past the inclined face 168 and is received on the latch-seat 169, thereby moving said arm and stopper laterally with relation to the bottle position and holding the stopper in release position. When the charging mouth is caused to approach the blank in the support, a trip 281 on the slide 174 engages the arm 133, and moves the same sufficiently to move the finger 165 off its seat 169 and cause the shank of the finger to engage the sloping face 168. (See Figs. 23 to 26 inclusive).

The spring 162 thereupon acts to urge said stopper toward the charging opening in the blank and causes the arm 133 to rest against a guide-piece 282 on the slide 174. When the charging mouth is retracted from charging position, the stopper end of the arm moves toward the axial line of the blank and lengthwise of the blank toward the charging opening in the blank, so that when the charging mouth is removed from the opening, it is automatically replaced by the stopper for closing the charging opening in the blank, the blank in the meanwhile being held in position between the arms 131, 132, the apertures 144 in the resilient band 141 registering with the charging opening in the blank, so as to present said charging opening to the stopper.

My improved means enable the silvering to be applied to the surface to be coated in ordinary temperatures, but if desired the vessels or blanks may be subjected to heat, preferably heated air, during their passage through the casing. For accomplishing this purpose I provide a heater 285, instanced as a gas heater having a suitable mixing valve for mixing the gas and air, and a proper regulating valve 287 for properly regulating the supply of gas. Two of these heaters are shown. The heat is conveyed into the casing by means of the flues of the heaters, the heat being in the form of heated air which acts on the vessels or blanks in the casing for supplying the proper amount of heat, for instance during cold weather, or if heat above normal temperature is desired.

Figure 3:
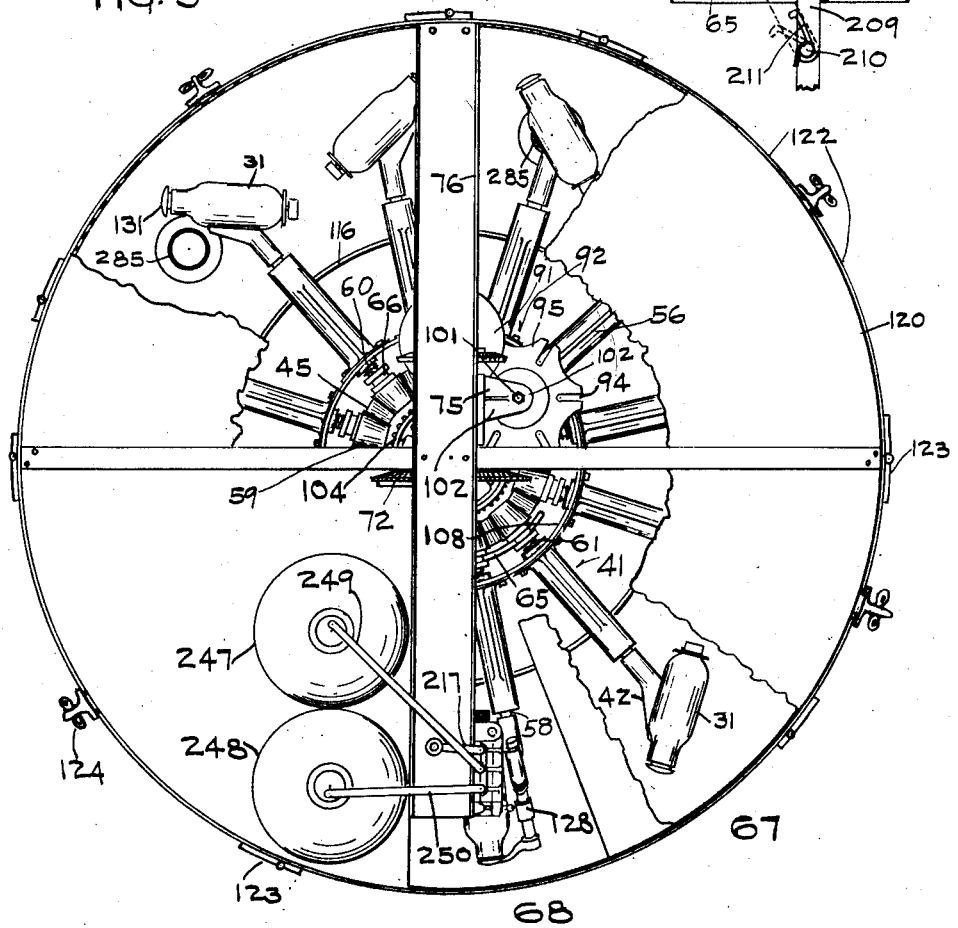
Fig. 3 is a plan view of my improved device, partly broken away.
Figure 5:
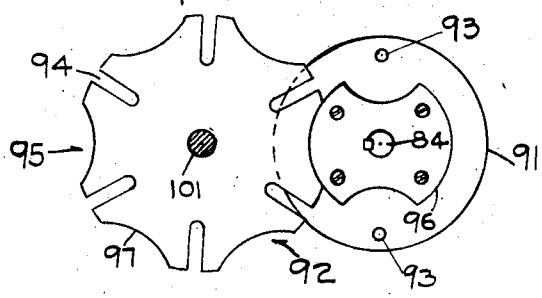
Fig. 5 is a bottom view of the intermittent driving mechanism, partly in section on the line 5—5 of Fig. 7.

During each cessation of rotation of the carrier, rotation of the vessel-support takes place *in situ*. The manner of mounting the vessels is such that the coating material in the space 34 is caused to pass about and between the walls and bottoms to be coated and lengthwise of said walls, in a serpentine course, for contacting and coating all parts of the inner surfaces of said walls and bottoms with a uniform coating. The vessels are instanced as mounted with their axes at an angle other than a right angle with relation to the axis of rotation of the shaft upon which the support for the bottle is mounted. The vessels thus have a combined rotary and end to end movement imparted thereto, partly illustrated by the various positions in which the vessels in Fig. 3 are shown, representing various positions which the supports and their vessels assume during the rotation of the shafts on which the supports are mounted.

The body of coating material in the bottle, when the latter has been charged and is in at-rest position, is exemplified at 288 in Fig. 25. When the vessel has been acted on by the coating material, the coating material is removed and the space and coated wall are rinsed, preferably by subjecting the space to repeated withdrawals of air by suction and injection of rinsing fluid to replace the air withdrawn by suction, the operation also causing agitation of the rinsing fluid upon the coated surface. The discharge of the coating material and rinsing of the wall may be accomplished by suitable rinsing means, for instance as shown and described in my aforesaid application.

Summarizing the operation of my improved apparatus, the vessel or blank to be coated, instanced as the bottle 31, is provided with a space 34, the inner surface of the wall of which is intended to be coated for heat insulation of the bottle. In the present instance rarefaction of air is caused in the space to be charged, followed by introduction of a silvering solution and of a reagent.

The vessel or blank is placed in a chuck 128 on a rotary support 42 at an inclination to its axis of rotation, and preferably at one side of said axis. The charging end of the chuck is located as by means of the stop 209, (Fig. 4), so as to present the opening 37 in the blank or vessel toward a charging mouth 172. (Figs. 10 and 11.)

The space is charged with coating material by means of the charging mouth 172 which is located on a slide 174 (see Figs. 19, 20, 21 and 22), automatically moved into charging relation. The bottle is placed between the arms 131, 132, (Figs. 23-27), of the chuck 128, forming part of the rotary support 42.

Control means are provided for controlling the suction and the amount of charged material and the time of passage of the same to the charging mouth.

These control means comprise pressers 236, 237, 238, (Figs. 14 and 15), operated by adjustable cams 256, 257, 258 (Figs. 14-18). The control means are operated during automatic charging position of the charging mouth by the cross-shaft 73 for intermittently rotating the cam-shaft 272, for controlling the suction and the charging with the silvering solution and the reagent in sequence. The intermittent rotation of the cam-shaft is accomplished by the mutilated gear 276 intermittently meshing with the pinion 277 on the cam-shaft.

A manifold 214 has charging tubes communicating with the infeeding side thereof, and a charging tube connecting the outfeeding side thereof with the charging mouth. (See Figs. 10 and 11). The tubes are arranged to be held to the charging frame 78 by means of a gate 221, provided for ready access to the tubes, coactive means for the pressers controlled by the cams being mounted on the charging gate.

The tubes are longitudinally positioned with relation to the charging gate by the ferrules 231, forming ports for the charging tubes below the pressers, (Figs. 14 and 16), arranged to be opened at the end of the charging operation by means of the cam-wheel 271 and the arm 269, for discharging any residue of coating material there may be in the charging passages below the pressers and relieving the vacuum in said portions of the passages and in the space 34.

A stopper 134 is provided for automatically closing the opening 37 communicating with the space 34. (See Figs. 23-27). This stopper is held in release position by being mounted on an arm 133, and having the operating finger 165 thereof rest on a seat 169. The slide 174 is provided with means for disengaging the finger 165 from the seat, and with means for guiding the stopper into closing position upon retraction of the charging mouth, (Figs. 20, 22 and 24), so as to close the space with the coating material therein and permit rotation of the support.

There is a series of the rotatable supports mounted on a carrier, the supports, except the ones at the operator's position, are arranged to rotate when the carrier is in at-rest positions, for causing the coating material in the space to move lengthwise of and around about the space in serpentine paths for applying the coating material to each part of the inner surface of the wall of the space.

Means are provided whereby when the blanks are in charging position, the pinions 59 rotating the same are automatically moved out of meshing relation with the driving gear 45 by means of the cam 65. (See Figs. 2, 6 and 7).

Intermittent movement is imparted to the carrier for causing travel of the supports, preferably in a casing in which the charged vessels may be subjected to heat. The advancing movements of the carrier and the charging movement of the charging mouth are alternating automatic movements. The movement of the carrier is caused by the intermittent gear 81 and the Geneva movement device 92. (Figs. 5-9). The charging movement of the charging mouth is accomplished by means of a rotating cam 195. (Figs. 7 and 8.)

The teeth of the mutilated gear and the cam are exemplified as having coincident axes of rotation alternately operating on the devices actuated thereby, for causing alternate rotation of the carrier and operation of the charging mouth.

I preferably mount the bottle so that when its axis is in a vertical plane, its axis is at one side of the axis of rotation of the shaft 58, as shown by the bottle in the charging position 68 in Fig. 3. So mounting the bottle aids in the intimate and uniform contact between the coating material and all portions of the surfaces being coated.

My invention provides rapid and effective means for coating the interior surface of the wall of the vessel, and is especially useful for providing the inner surface of the wall of the vacuum space of a vacuum insulated receptacle with a mirror or silvering coating.

Having thus fully described my invention, what I claim as new and desire to secure by Letters Patent, is:

1. In a coating machine of the character described, the combination of a carrier, blank-supports on said carrier, charging means for the blanks on said supports comprising a charging mouth, means for rotating said supports, means intermittently moving said carrier, means causing automatic approach and recession between said mouth and said respective blanks for charging said blanks, said last two named means arranged for alternate operations, and means causing cessation of rotation of the blank-support having thereon the blank being charged during the charging of said blank.

2. In a coating machine of the character described, the combination of a carrier, blank-supports on said carrier, charging means for the blanks on said supports comprising a charging mouth, means moving said carrier for successively placing said blanks in coactive relation with said mouth, automatic means causing automatic approach and recession between said mouth and said respective blanks for charging said blanks, and means causing cessation of rotation of the blank-support having thereon the blank being charged during the charging of said blank.

3. In a coating machine of the character described, the combination of a carrier, blank-supports on said carrier, means for rotating said blank-supports, blank-holding means on said supports holding said respective blanks at an inclination to the axis of rotation of the support of the blank, charging means for the blanks comprising a charging mouth, means for moving said carrier for successively placing said blanks on said blank-supports in coactive relation with the said mouth, and automatic means causing automatic coaction between said mouth and said respective blanks for charging said blanks.

4. In a coating machine of the character described, the combination of a casing, a carrier, blank-supports on said carrier, said casing provided with an opening, charging means for the blanks at said opening comprising a movable charging mouth, automatic means causing coaction between said mouth and said respective blanks for charging said blanks, means for rotating said supports, and means moving said carrier for moving said blank-supports in said casing during rotation of said supports.

5. In a coating machine for coating the inner surfaces of the walls of the insulating space of a double-walled vessel, the combination of a casing, a carrier, vessel-supports on said carrier, means for rotating said supports on said carrier, vessel-holding means on said supports holding the vessels thereon respectively at an angle to their axes of rotation, charging means for the vessels comprising a charging mouth, automatic means causing automatic coaction between said mouth and said respective vessels for charging said vessels, and means moving said carrier with said vessel-supports traveling in said casing.

6. In a coating machine of the character described, the combination of a casing having an opening, a carrier, blank-supports on said carrier, charging means for the blanks on said supports comprising a charging mouth at said opening, means causing automatic coaction between said mouth and said respective blanks for charging said blanks, means for rotating said supports, and means intermittently moving said carrier with said blank-supports traveling and rotating in said casing, said last two-named means arranged for alternate operations.

7. In a coating machine of the character described, the combination of a carrier, blank-supports on said carrier, means for rotating said supports on said carrier, blank-holding means on said supports holding the blanks thereon respectively at an inclination to their axes of rotation, charging means for the blanks comprising a charging mouth, automatic means causing coaction between said mouth and said respective blanks for charging said blanks, and means intermittently moving said carrier, said last two-named means arranged for alternate operations.

8. In a coating machine of the character described, the combination of a casing provided with an opening, a carrier, blank-supports on said carrier, means for rotating said supports on said carrier, blank-holding means on said supports holding the blanks thereon respectively at an inclination to their axes of rotation, means arresting rotation of said supports with said holding means in upwardly inclined relation, charging means for the blanks on said supports comprising a charging mouth at said opening, means causing automatic approach and recession in an inclined path between said mouth and said respective blanks for charging said blanks, and means intermittently moving said carrier with said blank-supports rotating and traveling in said casing.

9. In a coating machine, the combination of a carrier, blank-supports mounted on said carrier, means for rotating said blank-supports, and blank-holding means on said supports holding each of said blanks at an inclination to the axis of rotation of its support, and automatically acting charging means for charging the blanks with a coating material.

10. In a coating machine for coating the inner surfaces of the walls of the insulating space of double-walled vessels, the combination of a carrier, vessel-supports on said carrier, means for rotating said supports on said carrier, vessel holding means on said supports holding the vessels thereon respectively at an inclination to their axes of rotation for causing the coating material in said insulating space to move in reverse serpentine paths throughout said space, and automatic charging means automatically charging said space with a coating material.

11. In a coating machine for coating the inner surfaces of the walls of the insulating space of double-walled vessels, the combination of a casing, a carrier, vessel-supports on said carrier, means for rotating said supports on said carrier, vessel-holding means on said supports holding the vessels thereon respectively at an inclination to their axes of rotation for causing the coating material in said insulating space to move in reverse serpentine paths throughout said space, automatic means for automatically charging said space with a coating material, and means for moving said carrier with said vessel-supports traveling in said casing.

12. In a coating machine for coating the inner surfaces of the walls of the insulating space of double-walled vessels, the combination of a casing, a carrier, vessel-supports on said carrier, means for rotating said supports on said carrier, vessel-holding means on said supports holding the vessels thereon respectively at an inclination to their axes of rotation for causing the coating material in said insulating space to move in reverse serpentine paths throughout said space, automatic means for automatically charging said space with coating material, means for moving said carrier with said vessel-supports traveling in said casing, and means for heating said casing.

13. In a coating machine of the character described, the combination of a casing, blank-supports supporting blanks with their longitudinal axes at inclinations to their respective axes of rotation, said casing having an opening, means for causing travel of said supports in said casing and rotation of said supports during said travel, means for causing arrest of said travel of said supports respectively at said opening and arrest of rotation of said support at said opening, and automatic charging means at said opening for automatically charging said blanks with coating material.

14. In a coating machine for coating the wall of the insulating space of vessels of the character described, the combination of a carrier, vessel-supports thereon, means for rotating said vessel - supports, charging means for said vessel comprising a charging mouth, a charging passage for the coating material communicating with said mouth, control means for said passage, and automatic means automatically moving said mouth toward said respective vessels for charging said vessels, moving said control means for said charging passage, and causing cessation of rotation of said vessel-support at the charging position during coaction of said mouth with the vessel on said vessel-support.

15. In a coating machine for coating the wall of the insulating space of vessels of the character described, the combination of a carrier, vessel-supports thereon, means for rotating said vessel - supports, charging means for the vessel comprising a charging mouth, a suction-passage and a passage for charging material communicating with said mouth, automatic control means for said passages, automatic means moving said mouth toward said respective vessels for charging said vessels and for operating said control means, and means causing cessation of rotation of said vessel-support at the charging position during coaction of said mouth with the vessel on said vessel-support.

16. In a coating machine for coating the wall of the insulating space of vessels of the character described, the combination of a carrier, vessel-supports thereon, automatic charging means for the vessels comprising a charging mouth, automatic means causing automatic approach of said mouth toward said respective vessels for charging said vessels, automatic resilient locking means for the same, a passage for coating material communicating with said mouth, control means for the same, and means automatically moving said control means for control of the material through said passage, said last-named means provided with a trip acting counter to the resiliency in said locking means for tripping said locking means.

17. In a coating machine for coating the wall of the insulating space of vessels of the character described, the combination of a carrier, vessel-supports thereon, charging means for said vessels comprising a charging mouth, a suction passage, a coating-solution passage, and a reagent passage, a valve for each of said passages, automatic means causing automatic coaction between said mouth and said respective vessels for charging said vessels, automatic means for operating said valves for said suction-passage, said coating-solution passage and said reagent passage consecutively in the order named, and holding means for holding coactive relation between said charging mouth and said respective vessels, said valve operating means provided with means for releasing said holding means.

18. In a coating machine for coating the wall of the insulating space of vessels of the character described, the combination of a manifold, charging means comprising a plurality of tubes connecting with one side of said manifold, a valve for each of said tubes, a charging tube connecting with the other side of said manifold, and a backing part and a gate comprising clamping means at the respective sides of said manifold for clamping said tubes between said backing plate and said gate at both sides of said manifold.

19. In a coating machine for coating the wall of the insulating space of vessels of the character described, the combination of a manifold, charging means comprising a plurality of tubes connecting with one side of said manifold, a valve for each of said tubes, a charging tube connecting with the other side of said manifold, a backing part and a gate comprising clamping means at the respective sides of said manifold for clamping said tubes between said backing plate and said gate at both sides of said manifold, and adjusting means on said gate coacting with said valves for adjusting the passages in said tubes.

20. In a coating machine for coating the wall of the insulating space of vessels of the character described, the combination of a manifold, charging means comprising a plurality of tubes connecting with one side of said manifold, a valve for each of said tubes, a charging tube connecting with the other side of said manifold, a backing part and a gate comprising clamping means at the respective sides of said manifold for clamping said tubes between said backing plate and said gate at both sides of said manifold, release-ports in said first-named tubes below said valves, valves on said gate coacting with said ports, and means alternately operating said first-named valves and said second-named valves.

21. In a coating machine for coating the wall of the insulating space of vessels of the character described, the combination of a manifold, charging means comprising a plurality of tubes connecting with one side of said manifold, a valve for each of said tubes, a charging tube connecting with the other side of said manifold, a backing part and a gate comprising clamping means at the respective sides of said manifold for clamping said tubes between said backing plate and said gate at both sides of said manifold, release-ports in said first-named tubes below said valves, valves on said gate coacting with said ports, means for operating said second-named valves, and adjustable cam-means thereon for operating said first-named valves.

22. In a coating machine, the combination of a carrier, blank-supports on said carrier, charging means for the blanks on said supports comprising a charging mouth, intermittent moving means intermittently moving said carrier, intermittent moving means moving said charging mouth, and a mutilated toothed gear and cam rotating together and acting alternately on said respective intermittent moving means for operating the same.

23. In a coating machine, the combination of a carrier, blank-supports on said carrier for supporting blanks having a charging opening, charging means for the blanks comprising a charging mouth, intermittent moving means for said carrier, means for rotating said supports, means for arresting rotation of said respective supports with the charging opening of the blank thereon presented toward said charging mouth, intermittent moving means for moving said charging mouth, and automatic means causing alternate operation of said intermittent moving means for said carrier and for said charging mouth respectively for correlating said charging openings of said blanks and said charging mouth in charging positions.

24. In a coating machine, the combination of a carrier, blank-supports on said carrier, charging means for the blanks on said supports comprising a charging mouth, intermittent means intermittently moving said carrier, a lever moving said charging mouth, means rotating said blank-supports on said carrier, means positioning said blank-support in coactive relation with said charging mouth, means causing cessation of rotation of the blank-support during coactive relation of the blank thereon with said charging mouth, and a cam arranged to move said lever having operative connection with said intermittent means.

25. In a coating machine, the combination of a carrier, blank-supports on said carrier, charging means for the blanks on said supports comprising a charging mouth, intermittent means intermittently moving said carrier and locating the same in at-rest positions, a lever moving said charging mouth, means rotating said blank-supports comprising a driving gear and driven pinions, disengaging means disengaging operative relation between one of said pinions and said gear during at-rest positioning of said carrier, positioning means for said blank-supports to position the blank in at-rest position with relation to said charging mouth, and a cam having operative connection with said intermittent means arranged to move said lever.

26. In a coating machine, the combination of a carrier, blank-supports on said carrier, charging means for the blanks on said supports comprising a charging mouth, intermittent moving means intermittently rotating said carrier, a lever moving said charging mouth, control means controlling the charges comprising a rotatable member, a mutilated gear operating said intermittent moving means, and a cam coacting with said lever, said rotatable member, said mutilated gear and said cam having coincident axes of rotation.

27. In a coating machine, the combination of a carrier, blank-supports on said carrier, charging means for the blanks on said supports comprising a charging mouth, intermittent moving means intermittently rotating said carrier, a lever moving said charging mouth, adjustable control means for controlling the charges, a mutilated toothed gear intermittently driving said intermittent moving means, a cam intermittently moving said lever, a drive-gear, and a shaft to which said mutilated toothed gear, said drive-gear and said cam are secured having operative connection with said control means for operating the latter.

28. In a coating machine, the combination of a carrier, blank-supports on said carrier, charging means for the blanks supported by said blank-supports, means for intermittently rotating said carrier comprising a Geneva movement device, and driving gearing having operative connection with said charging means for automatically operating said charging means, and comprising a mutilated gear and a coacting gear therefor intermittently operating the pin-element of said Geneva movement, for the purpose described.

29. In a coating machine, the combination of a rotary carrier, blank-supports on said carrier, a reciprocating member arranged to act on the blanks on said blank-supports, means for intermittently rotating said carrier comprising a Geneva movement device, driving gearing for the pin-element thereof comprising a mutilated gear and a coacting gear therefor intermittently rotating said pin-element, and a cam rotating with said mutilated gear and arranged for moving said reciprocating member.

30. In a coating machine, the combination of a rotary carrier, a drive-shaft about which said rotary carrier is journaled, blank-supports on said carrier, means for rotating said supports, means for rotating said carrier comprising a gear fixed to said carrier, driving means for said last-named gear comprising a Geneva movement device, a mutilated gear intermittently rotating the pin-element of said Geneva movement device, gearing between said drive-shaft and said mutilated gear, and means causing cessation of rotation of a blank-support during intervals between rotations of said pin-element.

31. In a coating machine, the combination of a rotary carrier, a drive-shaft about which said rotary carrier is journaled, a bevel-gear thereon, blank-supports on said carrier, means for rotating said supports comprising bevel pinions operatively connecting with said bevel-gear, means for intermittently rotating said carrier comprising a gear fixed to said carrier, driving means for said last-named gear comprising a Geneva movement device, a mutilated gear intermittently rotating the pin-element of said Geneva movement device, gearing between said drive-shaft and said mutilated gear, and means automatically causing inactive relation between said bevel-gear and said respective blank-supports.

32. In a coating machine, the combination of a rotary carrier, a drive-shaft about which said rotary carrier is journaled, a bevel-gear thereon, blank-supports on said carrier, means for rotating said blank-supports comprising bevel-pinions operatively connecting with said bevel-gear, means automatically causing inactive relation between said bevel-gear and said respective blank-supports, a charging means for the blank on the blank-support having inactive relation with said bevel-gear, said charging means comprising a charging mouth, a lever moving said charging mouth, a rotating cam to operate said lever, said charging means including control means, means intermittently rotating said carrier comprising a gear fixed to said carrier, driving means for said last-named gear comprising a Geneva movement device, a mutilated gear intermittently rotating the pin-element of said Geneva movement device, and gearing between said drive-shaft and said cam and mutilated gear having operative connection with said control means.

33. In a coating machine, the combination of a rotary carrier, blank-supports thereon, a drive-shaft about which said rotary carrier is journaled, a gear fixed to said carrier, intermittently rotating gearing in train with said last-named gear and comprising a shaft parallel with said drive-shaft, a comparatively small bevel-pinion on each of said shafts, a cross-shaft, and comparatively large bevel-gears on said cross-shaft in mesh with said respective bevel-pinions, one of said bevel-gears being a mutilated gear.

34. In a coating machine, the combination of a rotary carrier, blank-supports thereon, charging means for the blanks carried by said blank-supports comprising a movable charging mouth, a drive-shaft about which said rotary carrier is journaled, a gear fixed to said carrier, intermittently rotating gearing in train with said last-named gear and comprising a shaft parallel with said drive-shaft, a comparatively small bevel-pinion on each of said shafts, a cross-shaft, and a cam and comparatively large bevel-gears on said cross-shaft, said bevel-gears in mesh with said respective bevel-pinions, one of said bevel-gears being a mutilated gear, and said cam arranged to move said charging mouth.

35. In a coating machine of the character described, the combination of a carrier, blank-supports mounted on said carrier for supporting blanks provided with a charging space, closing means on said supports for said charging space of said blanks, a charging mouth arranged to coact with said blanks, and means causing approach and recession between said mouth and said respective blanks for charging said charging space of said blanks, said last-named means provided with coacting means for said closing means whereby to control closing of said closing means upon recession between said mouth and the blank.

36. In a coating machine of the character described, the combination of a rotary vessel-support for supporting a vessel having a space the wall of which is to be coated, said rotary vessel-support comprising a chuck having arms between which said vessel is clamped, resilient means causing approach between said arms, a closure for the space to be coated, and resilient means actuating said closure for closing said space.

37. In a coating machine for coating the inner surface of the wall of a vessel having an opening for the space within said wall, the combination of a vessel-support comprising a chuck having arms between which said vessel is held, closure means comprising an arm and a closure thereon for said opening, means for positioning said last-named arm whereby to locate said closure to the side of said opening, and a charging means, said charging means comprising a part coacting with said closure means to cause said closure to close said opening.

38. In a coating machine for coating the inner surface of the wall of a vessel having an opening for the space within said wall, the combination of a vessel-support comprising a chuck having means between which said vessel is held, closure means comprising a closure for said opening, resilient means normally causing approach between said closure and the vessel position, a latch to normally hold said closure in release position, and a charging means comprising a part coacting with said closure means to cause closing movement of said closure.

39. In a coating machine for coating the inner surface of the wall of a vessel having an opening for the space within said wall, the combination of a vessel-support comprising a chuck arranged to hold the vessel therein at an inclination to the axis of rotation of said vessel-support, said chuck comprising means between which to locate the vessel, closure means comprising a closure for said opening, resilient means causing approach of said closure toward said opening, a latch arranged for latching relation by movement of said closure from said opening, a charging part comprising means acting on said closure means for releasing said latch, and means whereby to guide said closure to said opening upon retraction of said charging means.

40. In a coating machine for coating the inner surface of the wall of a vessel having an opening in said wall, the combination of a rotary vessel-support comprising a chuck having arms between which said vessel is held, an arm comprising a closure for said opening, resilient means normally causing approach between said last-named arm and the vessel-position, a latch to normally hold said last-named arm in release position, and a charging means comprising a part coacting with said closure means to release said latch.

41. In a coating machine for coating the inner surface of the wall of a vessel having an opening, the combination of a rotary vessel-support comprising a chuck having arms between which said vessel is held, an arm comprising a closure for said opening, resilient means normally causing approach between said last-named arm and the vessel-position, a latch to normally hold said last-named arm in release position, and a charging means comprising a part coacting with said closing means whereby to release said latch, and a part on which said closing means is adapted to ride in its closing movement.

42. In a coating machine for coating the inner surface of the wall of a vessel having an opening, the combination of a rotary vessel-support comprising a chuck having arms between which said vessel is held with its axis at an inclination to the axis of rotation of said vessel-support, a charging means comprising a charging mouth, automatic means moving said mouth toward said opening, closing means on said chuck comprising a closure for said opening, resilient means normally causing approach between said closing means and said opening, a latch to normally hold said closing means in release position, said charging means comprising a part to release said latch in its charging movement, and a part on which said closing means is adapted to ride in the retracting movement of said mouth.

In testimony whereof, I have hereunto signed my name in the presence of two subscribing witnesses.

ERICK P. LINDAHL.

Witnesses:
   JAMES J. FITZPATRICK,
   THERESA M. SILBER.